United States Patent [19]
Jha et al.

[11] Patent Number: 6,037,285
[45] Date of Patent: Mar. 14, 2000

[54] INFRARED TRANSMITTING OPTICAL FIBER MATERIALS

[75] Inventors: Animesh Jha, Uxbridge, United Kingdom; Sophie Jordery, Tregunc, France

[73] Assignee: BTG International Limited, London, United Kingdom

[21] Appl. No.: 09/025,106

[22] Filed: Feb. 17, 1998

Related U.S. Application Data

[63] Continuation of application No. PCT/GB95/01923, Aug. 15, 1995.

[51] Int. Cl.⁷ ............................ C03C 13/00; C03C 13/04; C03C 3/32
[52] U.S. Cl. .................. 501/37; 501/35; 501/40; 428/373; 428/378; 428/379; 65/385; 65/397
[58] Field of Search .................................. 501/37, 40, 35; 65/397, 385, 426, 430, 432, 431, 444; 428/373, 375, 378, 379

[56] References Cited

U.S. PATENT DOCUMENTS

| | | | |
|---|---|---|---|
| 4,647,545 | 3/1987 | Lucas et al. | 501/40 |
| 5,185,847 | 2/1993 | Fevrier et al. | 385/141 |
| 5,278,107 | 1/1994 | Tick et al. | 501/40 |
| 5,338,607 | 8/1994 | Kawamoto et al. | 428/373 |
| 5,346,865 | 9/1994 | Aitken et al. | 501/40 |
| 5,631,194 | 5/1997 | Akella et al. | 501/37 |

FOREIGN PATENT DOCUMENTS

| | | |
|---|---|---|
| 0470612 A1 | 2/1992 | European Pat. Off. . |
| 2286390 | 8/1995 | United Kingdom . |

OTHER PUBLICATIONS

Chemical Abstracts, vol. 99, No. 10, Columbus, Ohio, U.S., abstract No. 75526d, p. 283; M. Matecki et al., & J. Noncryst. Solids, vol. 56, No. 1–3, 81–86, 1983. (no month).
Patent Abstracts, vol. 14, No. 270 (C–727); & JP, A, 02 080 349 (Hoya Corp.) Mar. 1990.
Derwent WPI Abstract 93–080176110 & JP, A, 05 024 883 Feb. 1993.
Derwent WPI Abstract 93–121096115 & JP 050058674 A Mar. 1993.
Derwent WPI Abstract 93–031403104 & JP 040358131A Dec. 1992.
Derwent WPI Abstract 93–022289103 & JP 040349151A Dec. 1992.
Derwent WPI Abstract 92–327387140 & JP 040234021 Aug. 1992.
Hu et al., "preparation of a Nd doped Fluorozirconate glass laser fiber", Journal of Non–Crystalline Solids, vol. 184 pp. 218–221, May 1995.
Bartholomew et al., "Praseodymium doped cadmium mixed halide glasses for 1,3, micron amplification", Journal of Non–Crystalline solids, vol. 184, pp. 229–235, May 1995.

*Primary Examiner*—Michael Marcheschi
*Attorney, Agent, or Firm*—Pillsbury Madison and Sutro LLP

[57] ABSTRACT

An optical fiber amplifier is formed from glass doped with praseodymium. The glass may include one or more of cadmium mixed halide, hafnium halides, geranium and silicon disulphide based vitreous materials or fluorozirconate glass fibers. It is possible to provide an optical fiber amplifier which operates at a 1300 nm window for passive optical networks

12 Claims, No Drawings

INFRARED TRANSMITTING OPTICAL FIBER MATERIALS

This application is a continuation of PCT/GB95/01923 filed Aug. 15, 1995.

BACKGROUND OF THE INVENTION

1. Field of the Invention

The present invention relates to infrared transmitting optical fiber materials, to a method of producing an optical fiber and to an optical fiber amplifier.

2. Description of the Related Art

The development of silica glass single-mode optical fibers has led to the possibility of broad-band communication at second and third transmission windows situated at 1.3 $\mu$m and 1.5 $\mu$m respectively. In 1985, an erbium-doped silica optical fiber amplifier, known as EDFA, was developed for the third transmission window, with almost 97% quantum efficiency and a large signal gain of 50 dB. The 1.5 $\mu$m optical fiber amplifiers are planned for use in the transoceanic submarine cable networks. EDFA will play a key role in the high-speed data transmission networks.

However, globally the terrestrial networks utilize 1.3 $\mu$m window and currently electronic repeaters are used at the signal wavelength. The electronic repeaters, used in the networks, are prohibitively high cost items. Also, the electronic repeaters inherently introduce incompatibility between optical and electronic components at high bit rate transmission (>2.5 Gbit/sec). Hence there is a need for providing distortion-free amplification without converting the optical signals into an array of electrical pulses and vice-a-versa. Optical fiber amplifiers operating at 1300 nm window for passive optical networks (PONs) are therefore required.

SUMMARY OF THE INVENTION

According to an aspect of the invention, there is provided an optical fiber comprising glass including one or more of cadmium mixed halide, hafnium halides, and gallium-indium fluoride based vitreous materials or fluorozirconate glass fibers.

In embodiments in which the glass is doped with praseodymium, the rare-earth ions used as dopants are suitable for fluorescence in the 1300 nm wavelength-domain.

According to another aspect of the invention, there is provided a method of producing a glass fiber comprising the steps of providing starting compounds including cadmium fluoride and other halide ingredients; drying and fluorinating the cadmium fluoride material and drying and halogenating the halide ingredients; melting the dried material; and casting the melted material.

According to another aspect of the present invention, there is provided an optical fiber amplifier including an optical fiber as herein specified.

DETAILED DESCRIPTION OF THE INVENTION

A critical factor in designing an efficient 1.3 $\mu$m fiber amplifier based on $Pr^{+3}$ as the dopant ion is the selection of suitable glass hosts that would permit an efficient quantum yield of light at signal wavelength, i.e. hosts of adequate purity. We have developed a number of glass systems that are potentially suitable for fiber drawing trials and hence could be useful for fabricating fiber lasers and amplifiers.

These glasses with Pr-ions as the dopant are primarily cadmium mixed halide, hafnium halides and gallium-indium fluoride based vitreous materials and their derivatives and modifications. These are all potentially low phonon energy glasses which can be cast into 10–15 mm diameter rods of 10–15 cm in length for fiber drawing. All the above glasses also have excellent infrared transmission properties for other applications such as in sensors, detectors and medical devices.

As specified above, the land-based telecommunication network will utilize 1300 nm optical fiber amplifiers. The first possible category of 1300 nm optical fiber amplifiers is based on the Pr-doped glasses which has been developed by HP & BT&D. Currently fluorozirconate glass (ZBLAN) fibers are being developed for 1300 nm Pr-doped optical fiber amplifiers and the measured quantum efficiency is around 4 percent. The low quantum efficiency of ZBLAN fibers is limited due to large non-radiative decay process which determines the metastable lifetimes of $^1G_4$ level to $^3F_4$ level in Pr-doped glasses. The non-radiative lifetime is dependent on the phonon energy (580 $cm^{-1}$) of the host glass, which is significantly lower than the silica (1200 $cm^{-1}$) glass, and permits the depletion of the pump energy (1010 nm) via multiphonon relaxation process. The larger phonon energy of the glass host increases the probability of the non-radiative decay process because the number of phonons required to provide relaxation of Pr-ions from metastable $^1G_4$ level is small, and hence the process becomes energetically more favorable than the glass hosts having phonon energies lower than 580 $cm^{-1}$.

The number of phonon (p) involved in the non-radiative relaxation process can be determined by the energy gap ($\Delta E$ in $cm^{-1}$) and the phonon energy (hw) relationship: $p=\Delta E/hw$. The relationship clearly explains the significance of hw of glass hosts for Pr-ions as dopants. Here $\Delta E$ is the energy gap between the $^1G_4$ and $^3F_4$ levels.

Cadmium fluoride glasses have been made suitable for 1300 nm optical fiber amplifier application. In the bulk glass fabrication, the impurities must be controlled in order to eliminate the contribution of high phonon energy relaxation paths. The control of impurities and method of dopant addition has been systematically studied. The glass compositions melted with impurities dissolved are unsuitable for fiber fabrication, although the measured lifetimes are more than two times longer than the ZBLAN compositions. Table 1 summarizes the effect of impurities on the measured fluorescence lifetimes from $^1G_4$ level of Pr-ions in cadmium mixed halide glasses.

TABLE 1

Relationship between the fluorescence lifetime and impurities in mixed halide glasses.

| Glass composition mole percent | Lifetime $\mu$sec Impure glass | Lifetime $\mu$sec Purified |
|---|---|---|
| Clad glass<br>$CdF_2$ – 50, $BaX_2$ – 10, NaX = 40,<br>X = F, Cl, Br, I. | 180–210 | 290–330 |
| Core glass<br>$CdF_2$ – 50, $BaX_2$ – 10, NaX = 40 – a, KBr = a,<br>X = F, Cl, Br, I. | 180–210 | 290–330 |

The predicted fluorescence lifetimes in these glasses are expected to be of the order of 500 $\mu$sec. The shorter measured lifetimes in impure and relatively purified materials are due to the presence of high phonon energy impurities (>600 $cm^{-1}$) in the glass which appear to cluster around Pr-ions and provide fast non-radiative relaxation paths.

The preparation for bulk glass fabrication involves the following steps which differ for each type of halide glass. In particular, the chemical treatment of raw material halide powders such as cadmium fluoride and zinc, gallium and indium fluorides, which are the major constituents of cadmium mixed halide and gallium-indium fluoride glasses respectively, enhances the glass-forming tendency and the optical quality of the halide glasses. The optical, thermal and spectroscopic properties of these glasses after chemical treatment improve significantly in favor of realizing an optical fiber device. The metastable lifetimes of $^1G_4$ level in these glasses are strongly dependent on the overall impurity concentrations present in the glass.

a) Extensive drying and fluorination of cadmium, gallium, indium and zinc fluorides, all of which contaminated by high-phonon energy oxygen-associated impurities, must be carried out prior to melting the charge for making glass. These oxygen-containing impurities are typically oxides, oxyfluorides, nitrates, carbonates and sulphates. The minimum concentration of the fluorinating gas such as HF is determined by the chemical equilibrium.

b) Other halides such as sodium and barium chlorides should be dried under the atmosphere of either chlorine or HCl gas. The minimum concentration of the chlorinating gas e.g. HCl is determined by the chemical equilibrium.

c) $CdF_2$ is dried under a controlled atmosphere of $N_2$, $SF_6$ and HF gas mixture. The residual proportions of $SF_6$ and HF in the carrier nitrogen gas vary with the relative stability of oxide to be removed from the starting material. For example, the equilibrium concentrations of HF and $SF_6$ required in the nitrogen carrier gas is less for CdO than for either ZnO or GaOF and $Ga_2O_3$. Related chemical reactions also participate and assist the removal of adsorbed moisture. These impurity removal reactions, for example in cadmium fluoride, are described below. Reactions (i) and (ii) describe the oxide-to-fluoride conversion reactions whereas (iii) and (iv) are the moisture removal reactions.

(i) $2\ CdO+SF_6(g)=2\ CdF_2+SO_2(g)$
(ii) $CdO+HF(g)=CdF_2+H_2O(g)$
(iii) $2[CdF.OH]+SF_6=2\ CdF_2+2HF(g)+SO_2(g)+F_2(g)$
(iv) $CdF.OH+HF=CdF_2+H_2O\ (g)$ The component halides for a particular type of glass e.g. cadmium mixed halide should be similarly dried. After drying, the charge for cadmium mixed halide should be melted under HF/HCl gas mixture diluted with $N_2$ gas. This gas mixture should be maintained throughout the entire duration of the melting procedure and its composition is determined from the thermodynamic equilibrium between $CdF_2$ and HCl gas designated by $CdF_2+2HCl=CdCl_2+2HF$. The concentration of HCl gas should not exceed the thermodynamically prescribed value.

d) The glass melting procedure and the time for dopant addition in cadmium mixed halide glasses were carefully selected. The short prescribed melting time curtails the oxygen and hydroxyl ion pick-up. The addition of Pr-ions in the halide melt was administered at the homogenization temperature maintained at 775° C. for the cadmium mixed halide glasses. After the incorporation of Pr-ions, the melt was further homogenized for an additional 15 minutes, the total time at 775° C. being ½ hour. The melting and homogenization of cadmium mixed halide glass above 800° C. was found to be disadvantageous for the quality of the cast glass. A higher melting and homogenization temperature often led to rapid volatilization of cadmium salts as vapors from the melt.

e) Treatment of halide melts in a reduced pressure atmosphere is prescribed for a rapid removal of the gas bubbles from the melt prior to casting glass. The reduced pressure treatment of melt should not exceed longer than 2–3 minutes during which the chamber pressure should not be less than 0.90 atm. The partial removal of gas bubbles can also be achieved by stirring the melt with platinum wire.

f) Adopting the well-known rotational casting technique assists the removal of gas bubbles from the cast core-clad glass preforms.

g) Annealing of cast preforms should be carried out inside a controlled atmosphere furnace for relieving thermal stresses and for minimizing surface contaminants e.g. moisture.

h) The use of 1000–2000 ppm mixture of HCl and HF with nitrogen gas is recommended for fiber drawing This has been established from thermodynamics calculations which was also verified by carrying out complementary experiments.

i) Drawing fibers with an external case around drawing furnace to prevent water attack on glass is also recommended for loss-less fiber fabrication.

j) The hermetic coating of cadmium mixed halide glass with a suitable metallic film is recommended for improving the environmental sensitivity of this glass. The best candidate for this purpose appears to be tin and aluminum, both of which can be deposited by evaporation technique.

k) The core and clad gallium-indium fluoride glasses for preform fabrication (see Table 2) were fabricated by adopting the procedure described above for cadmium mixed halide glass. In particular, the exclusion of reactive atmosphere drying and purification from the main stream of glass preparation route was found to be unsuitable for making high-quality glass samples. The glass preparation without reactive atmosphere processing (RAP) often result into extensive crystallization on cooling. The impurity level and optical quality of the cast glass was therefore very much dependent upon the concentrations of $SF_6$ and HF gases in the nitrogen gas.

The overall drying and purification in RAP was very sensitive to temperature and time. At higher temperatures than 650° C. for RAP, gallium fluoride glasses of sufficiently high optical quality were difficult to produce. The fluorination time was usually longer than 12 hours. The purification process had a major influence on the devitrification tendency of the gallium fluoride glass. These results are summarized below in Table 2 by determining the value of $T_x$-$T_g$ gap which is a critical parameter for fiber drawing. The larger is the value of this parameter, the more stable is the glass and resists devitrification during fibre drawing.

A good quality glass preform usually yields better quality fibers. The methods described above are recommended to achieve enhancement in the fluorescence lifetimes.

It is also possible to manipulate the local phonon energy of Pr-ions in the glass host by selecting the processing steps as well as chemistry of the dopants.

For suppressing the moisture attack on core glass, a new form of cladding glass with sodium phosphate ($NaPO_3$) has been designed. In this glass sodium chloride from standard halide composition, listed in Table 1, is replaced by $NaPO_3$. The range of substitution is between approximately 2 to 30 mole percent, with 10 mole percent being ideally suited for the high refractive index core (1.615). The measured refractive indices of a few phosphate compositions based on $CdF_2$: (50), $BaX_2$: (10) and NaX: (40–y) are listed below where y is the mole percent of $NaPO_3$.

TABLE 2

Effect of the reactive atmosphere processing of $GaF_3$-based glasses on their thermal characteristics.
Composition (mole percent)
Core glass: 22 $GaF_3$, 13 $InF_3$, 30 $PbF_2$, 18 $CdF_2$, 13 $ZnF_2$, 2 $GdF_3$, 1 NaF, 1 LiF,
Clad Glass: 25 $GaF_3$, 13 $InF_3$, 29 $PbF_2$, 15 $CdF_2$, 13 $ZnF_2$, 2 $GdF_3$, 3 NaF.

| RAP Condition | $T_g$, °C. | $T_g$, °C. | $T_x$-$T_g$, °C. | Remarks |
|---|---|---|---|---|
| a) Cast bulk clad glass treated in 2.5 vol % HF + 97.5 vol % $N_2$ at 600° C. for 20 hours. High oxygen content $GaF_3$ powder (0 wt % = 0.4) | 254 | 300 | 46 | Clear glass rod with lots of gas bubbles in the centre along the axis. Some microcrystals present. Multiple crystallization peaks. $T_p$ – $T_x$: 10° C. |
| b) clad glass composition powder except $SF_6$ gas was used with $N_2$ for 19 hours. Low oxygen content (0.07 wt % O) | 254 | 345 | 91 | Clear glass. Gas bubbles present along the axis of the glass rod. Two major crystallization peaks, $T_p$ – $T_x$: 5° C. |
| c) same composition as b) except $NH_4HF_2$ was used at 350° C. for 2 hours and slowly heated to melting temperature of 800° C. in 2 hours in $N_2$ gas | 252 | 343 | 91 | Along the axis of the cast rod, crystals nucleated. Thermal analysis performed on the clear glass on the periphery. $T_p$ – $T_x$: 13° C. |
| d) same composition as in b). $GaF_3$ and $InF_3$ separately fluorinated in $SF_6$ at 600° C. for 19 hours. Prior to this, $CdF_2$ and $PbF_2$ fluorinated with HF at 375° C. for 5 hours. | 249 | 343 | 94 | Clear glass rod with no bubbles and crystals. $T_p$ – $T_x$: 15° C. |
| e) same composition as b) except fluorinated in $SF_6$ + HF atmosphere at 600° C. for 3 hours and then 19 hours in $SF_6$ at 600° C. | 256 | 348 | 88 | Clear glass and a few bubbles, $T_p$ – $T_x$: 19° C. broad crystallisation peak |
| f) HF + $SF_6$ fluorination of clad powders at 400° C. for 19 hours. | 250 | 333 | 83 | Clear glass and no bubbles, $T_p$ – $T_x$ = 4° C. |
| g) same as e) plus zinc fluoride separately fluorinated with $SF_6$ + HF at 600° C. | 254 | 354 | 100 | Very clear glass, a few bubbles, $T_p$ – $T_x$: 11° C. |

All RAP treated powders were melted in the temperature range of 800°–825° C. and then cast in a preheated brass mould at 240° C. All glasses were annealed for several hours at this temperature.

| y, mol % | refractive index | Thermal Expansion coefficient, α/°C. |
|---|---|---|
| 5 | 1.5870 | 230 × 10⁻⁷ |
| 7 | 1.5861 | |
| 10 | 1.5828 | |
| 15 | 1.5804 | 225 × 10⁻⁷ |

The index and the coefficient of thermal expansion coefficient are matched to yield the value of NA greater than 0.3 which is a requirement for producing efficient Pr-doped fiber device for amplification.

The cladding glass of 7 and 10 mole percent containing phosphates have been drawn into fibers of 65 μm core diameter. The total measured loss in these fibers varied between 10 dB/m and 7 dB/m at 700 nm and 1250 nm respectively. For improving the durability of the phosphate fibers, it is recommended that the fibers should be coated with either aluminum metal or tin metal.

The addition of $NaPO_3$ is carried out during the glovebox melting stage.

Gallium-indium fluoride glass rods manufactured by employing RAP had an enhanced stability against devitrification. The rods manufactured without RAP yielded fibers with 40–60 dB/m loss. After RAP, the total loss was due to surface defects such as uneven rod surface, solidification striations, etc. The measured loss was 10–20 dB/m.

We claim:

1. A method of producing a glass fiber comprising:
   drying and fluorinating cadmium fluoride or gallium indium fluoride to form a dried fluorinated material;
   melting the dried fluorinated material to form a melted material; and
   casting the melted material to form a cast preform.

2. The method of claim 1, said method further comprising adding a praseodymium dopant during said melting of the dried material.

3. The method of claim 1, wherein said drying of the cadmium fluoride or gallium indium fluoride is performed in an atmosphere comprising a gas mixture of $N_2$, $SF_6$, and HF.

4. The method of claim 1, wherein said melting of the dried material is performed in a gas mixture comprising HF/HCl.

5. The method of claim 1, wherein said melting of the dried material is performed in a reduced pressure atmosphere.

6. The method of claim 1, further comprising annealing the cast preform in a controlled atmosphere furnace.

7. The method of claim 1, further comprising drawing the cast preform into a glass fiber in a 1000 to 2000 ppm mixture of HCl and HF with nitrogen gas.

8. The method of claim 7, wherein said drawing of the cast preform is conducted in a surrounding case.

9. The method of claim 7, further comprising coating the glass fiber with at least one member selected from the group consisting of a polymer and a metal.

10. An optical fiber comprising:
    a core comprising about 50 mol % $CdF_2$, about 10 mol % $BaX_2$ and about 40 mol % of a combined amount of NaX and KBr; and
    a cladding layer comprising about 50 mol % $CdF_2$, about 10 mol % $BaX_2$, about 40 mol % of a combined amount of NaX and $NaPO_3$, wherein X is selected from the group consisting of F, Cl, Br and I.

11. The optical fiber of claim 10, wherein in said cladding layer NaX is present in an amount between about 10% and about 38 mol % and $NaPO_3$ is present in an amount between about 2 and about 30 mol %.

12. An optical fiber amplifier comprising an optical fiber of claim 10.

* * * * *